United States Patent
Kaizuka et al.

(10) Patent No.: US 6,490,887 B2
(45) Date of Patent: Dec. 10, 2002

(54) METHOD FOR CONVERTING POLYCHLORINATED BIPHENYL OIL INTO A RESOURCE, AGENT FOR DECOMPOSING POLYCHLORINATED BIPHENYL OIL, AND RECLAIMED MATERIAL

(76) Inventors: Yasuhiro Kaizuka, 1-6-2-406, Kameido, Koutou-ku, Tokyo, 136-0071 (JP); Yoshiji Watanabe, 2-4-10-101, Kuwano, Kouriyama-shi, Fukushima 963-8025 (JP); Juntarou Yoshioka, 23, Hirao-Jousuimachi, Chuo-ku, Fukuoka-shi, Fukuoka 810-0029 (JP)

( * ) Notice: Subject to any disclaimer, the term of this patent is extended or adjusted under 35 U.S.C. 154(b) by 0 days.

(21) Appl. No.: 09/948,587

(22) Filed: Sep. 10, 2001

(65) Prior Publication Data

US 2002/0053220 A1 May 9, 2002

Related U.S. Application Data (63) Continuation-in-part of application No. 09/517,446, filed on Mar. 2, 2000, now abandoned.

(51) Int. Cl.[7] .............................. C04B 5/06; C03B 5/18
(52) U.S. Cl. .......................... 65/19; 65/134.8; 588/207; 588/208; 588/209; 588/252
(58) Field of Search .................. 65/19, 134.8; 588/207, 588/208, 209, 252

(56) References Cited

U.S. PATENT DOCUMENTS

| | | | | |
|---|---|---|---|---|
| 4,468,376 A | * | 8/1984 | Suggitt | |
| 5,188,649 A | * | 2/1993 | Macedo et al. | |
| 5,744,689 A | * | 4/1998 | Taguchi | |

FOREIGN PATENT DOCUMENTS

JP          60-139263          * 7/1985

* cited by examiner

Primary Examiner—Michael Colaianni
(74) Attorney, Agent, or Firm—Kanesaka & Takeuchi (57) ABSTRACT

The method for converting harmful polychlorinated biphenyl (PCB) oil into a resource includes chemical decomposition treatment, pelletizing treatment and thermal decomposition treatment. The chemical decomposition treatment uses a decomposing agent including calcium oxide powder coated with a vegetable oil and quartz porphyry powder, causes a decomposing action of CaO and far-infrared rays emitted from quartz porphyry, to act onto polychlorinated biphenyl oil, and decomposes the polychlorinated biphenyl oil into powder including a metal salt. The pelletizing treatment hardens the powder into pellets. The thermal decomposition treatment melts the pellets and glass cullet at a temperature above the thermal decomposition temperature of the PCBs for molten integration of the pellets and glass cullet as slag. The slag is cooled and the solid substance can be widely used as various types of construction materials and agricultural materials.

7 Claims, 7 Drawing Sheets

METHOD FOR CONVERTING POLYCHLORINATED BIPHENYL OIL INTO A RESOURCE, AGENT FOR DECOMPOSING POLYCHLORINATED BIPHENYL OIL, AND RECLAIMED MATERIAL

CROSS-REFERENCE TO RELATED APPLICATION

This is a CIP application of Ser. No. 09/517,446 filed on Mar. 2, 2000, abandoned.

BACKGROUND OF THE INVENTION AND DESCRIPTION OF THE RELATED ART

The present invention relates to a method for converting harmful polychlorinated biphenyl oil (PCB) into a resource, whereby polychlorinated biphenyl oil is regenerated into a resource useful as a raw material, an agent for decomposing polychlorinated biphenyl oil, and a reclaimed material.

Polychlorinated biphenyl oil (hereunder, PCB) exhibits different properties depending on the number and positions of chlorine atoms in the biphenyl, but generally has excellent physical properties and is chemically stable, so that it is used as a heating medium, an insulating oil or the like.

However, PCBs decompose slowly when incorporated into the body, and exhibit toxicity as they are accumulated over long periods. While PCBs are not currently produced, they were once widely used in the past as electrical insulating oil for transistors and other devices, and therefore it is expected in the future that activity will be directed toward collection and waste disposal of established devices in which PCBs have been used, as well as treatment, collection and disposal of PCBs that have flowed out into the environment.

A typical disposal method for PCBs is incineration. Not only PCBs but also many other harmful chemical substances can be decomposed and rendered harmless by incineration. However, incineration disposal often produces new harmful substances such as dioxins during the incineration disposal process, and although efforts are being made to establish high-temperature combustion treatment techniques, at the current time in Japan, no incineration treatment facility sites are being realized due to concerns about their influence on the surrounding environments.

As regards techniques for rendering PCBs harmless, for example, a "chemical extraction decomposition method" had been introduced on an Internet web site of the Tokyo Electric Power Company (Press Release: "Development of Treatment Techniques for Rendering PCBs Harmless", Dec. 2, 1996) (Prior Art Example 1). The method of Prior Art Example 1 is a method whereby a solvent is added to an insulating oil containing PCBs and the chlorine (Cl) in the PCBs is activated and reacted with sodium hydroxide (NaOH) to convert the PCBs to completely harmless salt (NaCl) and biphenyl.

It is emphasized that the effects provided by this method are that:

the treatment can be carried out in completely sealed facilities, wherein there is absolutely no effect on the surrounding environment, and high decomposition performance is ensured that allows its application on a practical level for the first time, for PCBs in insulating oils either at low concentration (about 0.02%) or high concentration (about 70%), the chemical reaction is a safe treatment method since it is carried out under conditions of about 200° C. and ordinary pressure, there is no generation of harmful substances during the reaction, only harmless insulating oils and salt remain after the treatment, and they can be reused as the fuel oil or regenerated insulating oil.

This is indeed considered to be a technique based on an excellent concept from the standpoint of making possible not only treatment to render PCBs harmless, but also reuse the reaction products as resources. The full concept of the "chemical extraction decomposition method" referred to above is not obvious just from the disclosed contents mentioned above, but it is essentially believed to be a method for rendering PCB harmless by chemical reaction alone.

There is a general problem in that with a chemical reaction alone it is not always possible to guarantee that 100% chemical conversion is occurring. For example, even if the amounts of residual PCB satisfy safety standards, the problem of residual PCBs has not been solved.

As a method for solving such problems, a method for making PCBs harmless has been proposed (refer to U.S. Pat. No. 5,744,689), in which PCB oil is converted to harmless chlorine compounds such as calcium chloride, magnesium chloride, etc., by utilizing a decomposing action and heat-generating reaction of Ca using a treating agent containing calcium oxide and at least silicon dioxide and magnesium. However, where the above-described method is employed, not only are the remaining amounts of PCBs made uneven even after the treatment, but it also has been found that, even if PCBs are initially decomposed to harmless chlorine compounds, the decomposed substances are restored to PCBs again. Although the reason why such a phenomenon occurs is not necessarily clear, it is considered that the decomposed substances of PCBs are formed based on partially unstable bonding. Also, there is another problem in that calcium oxide (quick lime), which is the main element of the decomposing agent, absorbs humidity in the atmospheric air to cause its quality to be lowered, and no expected decomposing action can be carried out.

It is therefore an object of the invention to provide a method for converting harmful polychlorinated biphenyl oil (PCB oil) into a resource, by which polychlorinated biphenyl oil is regenerated into a resource useful as a raw material without being restored to PCBs again after PCBs are initially decomposed to be harmless, an agent for decomposing polychlorinated biphenyl oil, and a reclaimed material regenerated by said method for converting harmful polychlorinated biphenyl oil.

SUMMARY OF THE INVENTION

In order to achieve this object, the method for converting polychlorinated biphenyl oil into a resource, according to the invention, is a method for converting polychlorinated biphenyl oil into a resource by a chemical decomposition treatment, a pelletizing treatment and a thermal decomposition treatment, wherein the chemical decomposition treatment is a treatment in which a decomposing action of CaO and far-infrared rays emitted by quartz porphyry act on PCB oil, and the PCB oil is chemically converted to produce a powder containing a metal salt, the pelletizing treatment is a treatment in which powder produced by the chemical decomposing treatment is hardened into pellets, and the thermal decomposition treatment is a treatment in which the pellets are heat treated with glass cullet at a temperature above the thermal decomposition temperature of the polychlorinated biphenyl for molten integration, and the molten integrated slag is cooled to be made into a solid to be reused as a resource.

The slag obtained by the thermal decomposition treatment is cooled for reuse as a solid.

Also, the chemical decomposing treatment includes a process of decomposing PCBs by causing heat, which is caused by an exothermic reaction of CaO, to act on quartz porphyry and irradiating far-infrared rays from the quartz porphyry under a condition that the quartz porphyry is heated above 200° C.

Also, the chemical decomposing treatment is a treatment in which minus ions radiated from quartz porphyry are acted on PCB oil and the PCB oil is further decomposed by its reduction action.

The thermal decomposition treatment is also a treatment for thermal decomposition of the PCB oil component possibly remaining in the powder produced from the chemical decomposition treatment.

The thermal decomposition treatment is carried out in a melting furnace with coke as the fuel, and the pellets produced by the pelletizing treatment also serve to adjust the degree of basicity for loading into the melting furnace.

The invention still further provides a method for converting PCB oil into a resource by chemical decomposition treatment, pelletizing treatment and thermal decomposition treatment, wherein the chemical decomposition treatment is a treatment in which the PCB oil is chemically converted into powder containing a metal salt, to protect the working environment from contamination by PCB oil during the thermal decomposition treatment, the pelletizing treatment is a treatment in which the powder produced by the chemical decomposition treatment is worked into pellets as pretreatment to the thermal decomposition treatment, in order to prevent the powder from blowing away and facilitate its handling during the thermal decomposition treatment, and the thermal decomposition treatment is a treatment in which the pellets obtained by the pelletizing treatment are loaded together with glass cullet into a melting furnace with coke as the fuel and both are melted in the melting furnace at a temperature above the thermal decomposition temperature of the PCBs, so that the pellets are melted and integrated with the glass to obtain slag which is then cooled for reuse as a solid.

A decomposing agent of PCB oil according to the invention is a decomposing agent of PCB oil, which contains calcium oxide powder whose surface is coated with a vegetable oil, and quartz porphyry powder.

Also, a reclaimed material that is obtained by the method for making PCB oil into resources is a slag that is obtained by the thermal decomposition treatment and is a radiator of far-infrared rays.

The invention renders PCB oil harmless by a two-stage treatment process and provides by-products that can be utilized as renewed resources. The pretreatment comprises chemical decomposition treatment and pelletizing treatment, while the post-treatment consists of thermal decomposition treatment.

The chemical decomposition treatment is a treatment in which the PCB oil is chemically converted to produce powder containing a metal salt by applying a decomposition action and an exothermic reaction of CaO to PCB oil, and acting far-infrared rays emitted by quartz porphyry onto the PCB oil, thus preventing contamination of the post-treatment working environment by PCB oil, while the pelletizing treatment of the produced powder prevents said powder from being blown into the environment during the thermal decomposition treatment and further facilitates handling.

The post-treatment is a treatment in which the pellets are thermally decomposed and undergo molten integration with the glass cullet. The slag produced by molten integration of the pellets and glass cullet is cooled to give a lustrous granite-like solid. The solid is a radiator of far-infrared rays and can be reused as a resource by pulverizing it or cutting it into a desired shape.

BRIEF DESCRIPTION OF THE DRAWINGS

FIG. 2($a$) through FIG. 2($c$) are views showing the order of steps in a treatment process for a method for converting PCB oil into a resource according to the invention.

FIG. 3($d$) through FIG. 3($f$) are views showing the order of steps in a treatment process for a method for converting PCB oil into a resource according to the invention.

FIG. 4($g$) through FIG. 4($k$) are views showing the order of steps in a treatment process for a method for converting PCB oil into a resource according to the invention.

FIG. 5($l$) through FIG. 5($n$) are views showing the order of steps in a treatment process for a method for converting PCB oil into a resource according to the invention.

DETAILED DESCRIPTION OF THE INVENTION

Embodiments of the present invention will now be explained with reference to the accompanying drawings. In a method for making PCB oil into resources according to the invention, the PCB oil is made harmless by two-stage treatment consisting of pre-treatment and post-treatment, by which PCB oil can be made into resources. The pre-treatment includes a chemical decomposition process and a pelletizing process. According to the invention, the chemical decomposition treatment carried out as pretreatment is, specifically, treatment in which the decomposing action and reaction heat of CaO are acted onto the PCB oil, simultaneously, intensive far-infrared rays are irradiated thereon from quartz porphyry by utilizing reaction heat of CaO, and further a reduction action of minus ions irradiated from quartz porphyry is acted thereon, thereby decomposing the PCB oil into metal salt-containing powder, and the treatment produces powder in which at least the PCB component is uneluted.

For the chemical decomposition treatment, there is used a decomposition agent composed mainly of calcium oxide (CaO) powder surface-coated with a vegetable oil and quartz porphyry powder. Commercially available calcium oxide (CaO) sometimes includes trace amounts of Na, Mg, K and the like in the form of $NaCO_3$, $MgCO_3$ and $KCO_3$, but these components can also be effectively used with CaO in the chemical reaction of PCB.

The vegetable oil coating the surface of CaO serves to lessen the intense exothermic reaction of CaO, and it is added in the range of 1–3% with respect to CaO. If the vegetable oil is excessively added at greater than 3%, the exothermic reaction of CaO will be blocked, whereas if it is less than 1% it will not be able to lessen the intense exothermic reaction.

Figure 6:
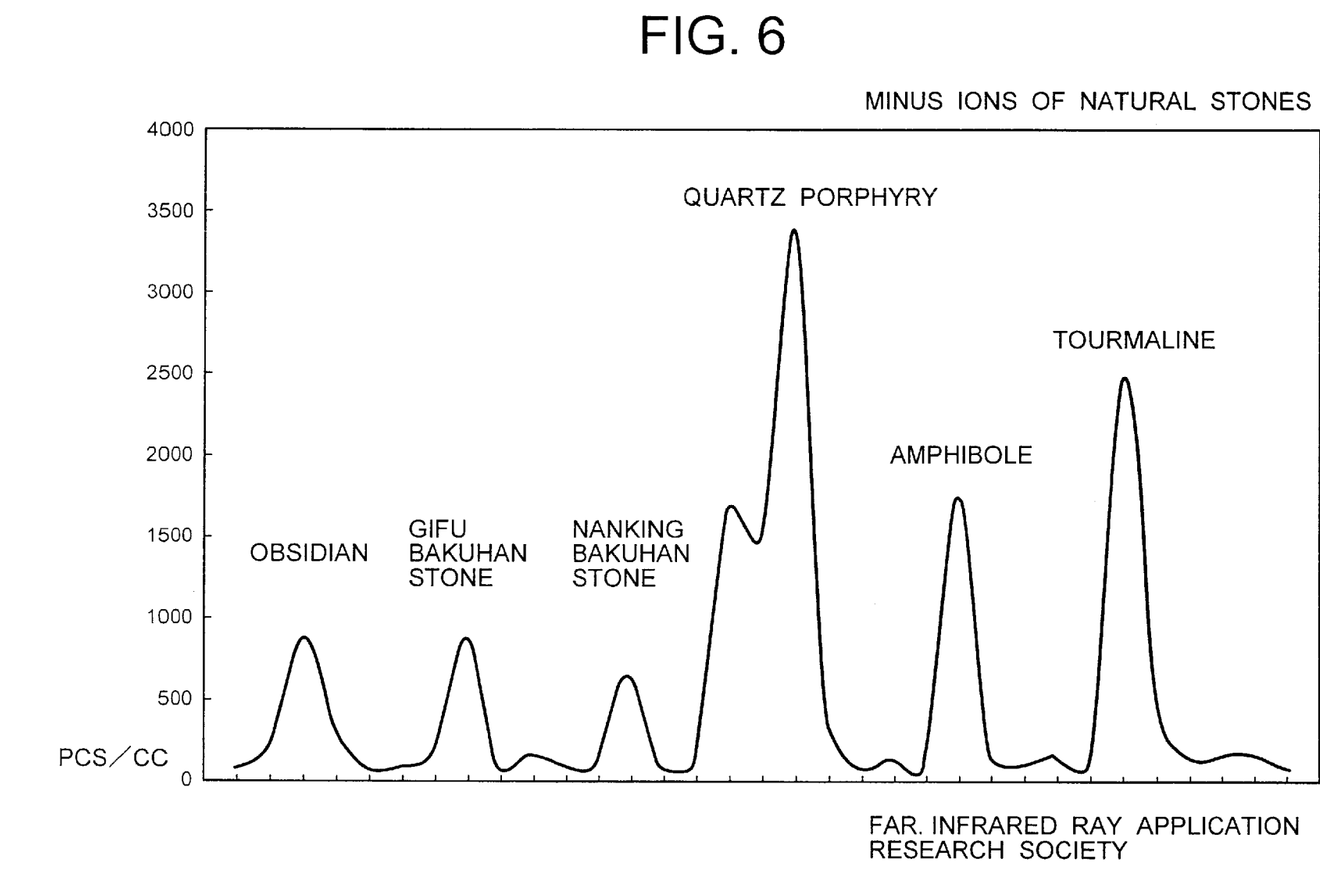
FIG. 6 is a graph showing the number of generations of minus ions per cc of natural ores.

Quartz porphyry is used as a radiator of far-infrared rays and minus ions. Table 1 shows a comparison between the chemical constituents of quartz porphyry and other energy ores, and FIG. 6 shows the number of generations of minus ions of natural ores per cc thereof.

TABLE 1

Comparison between the chemical constituents of quartz porphyry and those of other energy ores

| Materials | Main Constituents | | | | | | | | |
|---|---|---|---|---|---|---|---|---|---|
| | $SiO_2$ Silica (quartz) | $Al_2O_3$ Alumina | $Fe_2O_3$ Ferrous oxide | CaO Calcium | MgO Magnesium | $Na_2O$ Sodium | $K_2O$ Potassium | $TiO_2$ Titanium | Far-infrared ray emissivity |
| Quartz porphyry | 82.25 | 8.59 | 1.06 | 1.55 | 0.37 | 2.26 | 2.96 | 0.33 | 96.7% Average: 90% or more |
| Obsidian | 73.84 | 13.00 | 1.82 | | | 3.82 | 3.92 | | |
| Tourmaline (black) | 38.50 | 35.90 | 3.00 | 0.20 | | 0.50 | 0.10 | | Average: 90% |
| Oyaishi stone | 66.96 | 12.55 | 1.25 | 1.92 | 0.47 | 2.37 | 2.35 | | |
| | 69.76 | 14.01 | 1.29 | 2.00 | 3.55 | 3.16 | 3.19 | | |
| Plumbago phyllite | 67.20 | 14.50 | 1.29 | 1.64 | 1.81 | 2.25 | 2.87 | | Average: 80% |

Quartz porphyry is a natural ore, which is very close to a rock crystal and has remarkably high quartz content among energy ores and remarkably greater types of rare elements. It is known that, if quartz porphyry is subjected to heat exceeding 100° C., the quartz porphyry emits far-infrared rays whose wavelength is 4 through 14 μm, and if the heat reaches 200° C., the irradiation energy is maximized. Furthermore, the number of generations of minus ions of quartz porphyry is remarkably higher than that of Tourmaline (2000 pcs per cc), and reaches 3000 pcs per cc in fact. Therefore, if quartz porphyry is subjected to heat exceeding 100° C., the quartz porphyry emits far-infrared rays whose wavelength is 4 through 14 μm, and if the heat reaches 200° C., the irradiation energy is maximized. A preferable amount of adding with regard to CaO is 5 through 15%.

Figure 1:
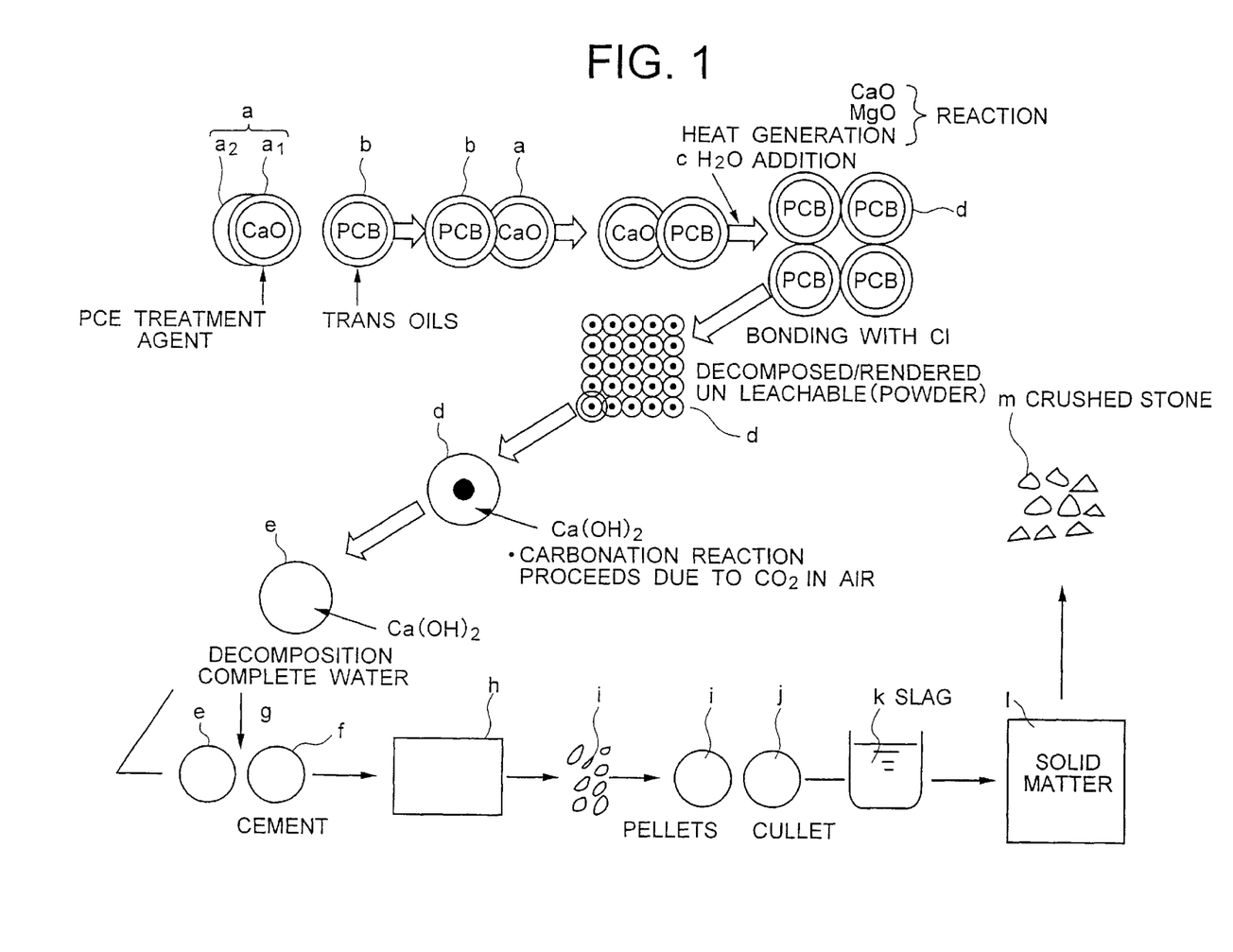
FIG. 1 is a schematic illustration of a reaction in a method for converting PCB oil into a resource according to the invention.

In FIG. 1, PCB oil (b) is thoroughly stirred and mixed with a decomposition agent (a) composed mainly of calcium oxide (CaO) powder (a1), whose surface is coated with a vegetable oil, and quartz porphyry (a2), after which water ($H_2O$) (c) is added. The addition of water (c) causes CaO surface-coated with the vegetable oil to react with water, whereby the reaction:

$$CaO + H_2O = Ca(OH)_2$$

proceeds slowly, and the PCB oil (b) is decomposed at the exothermic temperature of 100–250° C. and bonds with the freed chlorine (Cl) producing powder (d) with uneluted PCB. On the other hand, by causing a temperature above 100° C. to act onto quartz porphyry by subjecting a reaction heat of CaO onto the quartz porphyry, in particular, causing a temperature above 200° C. to act thereonto, intensive far-infrared rays are irradiated from quartz porphyry under the temperature conditions, wherein it is possible to decompose PCBs. Simultaneously, by a reduction action of minus ions emitted from quartz porphyry, not only PCBs but also environment contaminating substances included in PCB oil are intensively decomposed and treated, wherein PCB constituents are made into at least uneluted powder. Further, when MgO is included in the decomposition agent, it is converted to $Mg(OH)_2$ and generates heat. $Ca(OH)_2$ then absorbs $CO_2$ in air whereby a carbonation reaction proceeds, finally producing a reacted powder (e) containing $Ca(OH)_2$ as a hydrophobic form of calcium, salt (NaCl), and quartz porphyry powder.

When the decomposition agent (a) contains Na, Mg, K or the like in the form of $NaCO_3$, $MgCO_3$ and $KCO_3$ in addition to CaO, Na, Mg, K and Ca will bond with Cl producing a powder containing MgCl, KCl and CaCl, thus completing decomposition of the PCB.

For the subsequent pelletizing treatment, cement (f) is added to the powder (e) that is produced by the chemical decomposition treatment, and the mixture is kneaded with a suitable amount of water (g) and solidified, after which the solid (h) is worked into pellets (i) of an appropriate size. The powder produced by the chemical decomposition treatment is worked into pellets (i) in order to prevent generation of dust due to powder blowing away during the subsequent step of thermal decomposition treatment, and there is no restriction on the size.

The thermal decomposition treatment that is carried out as post-treatment is a treatment whereby the pellets (i) obtained by the pelletizing treatment are heat treated with glass cullet (j) in a melting furnace at a temperature above the thermal decomposition temperature of the PCB for molten integration thereof. The thermal decomposition treatment is preferably carried out in the melting furnace with coke as the fuel.

The pellets (i) and glass cullet (j) are loaded into the melting furnace, and injection of oxygen-enriched high-temperature air through the blast nozzle into the coke filled in the melting furnace produces a high temperature of 1700–1800° C. in the furnace, while the mixture of pellets (i) and glass cullet (j) reside for a relatively long time in the coke-filled layer, so that the PCB oil component which may remain in the powder produced by the chemical decomposition treatment undergoes complete thermal decomposition, providing a slag (k) in which the pellets and glass cullet are integrally melted.

When a melting furnace with coke as the fuel is used for the thermal decomposition treatment, the pellets produced by the pelletizing treatment contain limestone, and hence also serve for adjustment of the degree of basicity for loading into the melting furnace, such that no loading of new limestone is needed.

The obtained slag (k) is appropriately removed from the furnace and cooled to provide a lustrous granite-like solid (l). This obtained solid (l) is pulverized into slag crushed stone (m) as necessary, and reused as resources. Since the solid substances or slag finally obtained by the above-described treatment includes quartz porphyry, it is an intensive far-infrared ray radiator. The solid that is obtained by the final treatment emits far-infrared rays, whose wavelength is 4 through 14 μm, suitable for growth of plants. Therefore, the solid substances that are obtained by the final treatment are used for wave-suppressing blocks and underwater reef areas where fishes live, thereby fostering growth of waterweeds and/or seaweeds, whereby it is possible to obtain an effect of preventing seashores from being burnt. Also, if such slag-crushed stones are used as aggregates for asphalt pavement, the temperature can be increased by 4° C. by irradiation of its infrared rays. 5-watt thermic ray heaters are provided in an asphalt road in which slag-crushed stones by-produced by the method according to the invention are used, and an electric current is provided to the 5-watt thermic ray heaters, wherein it is possible to raise the temperature of the road up to approx. 20° C., and it is possible to construct roads which are excellent in an effect of melting snow. In addition, the above-described crushed slag is processed to be like beads and blended with culture medium soil for in-house cultivation, wherein it is possible to increase aerobic bacteria necessary for the growth of plants, and such effects can be brought about, by which the growth thereof can be fostered, and harmful insects carrying diseases can be prevented from occurring.

[Embodiments]

Figure 2A:
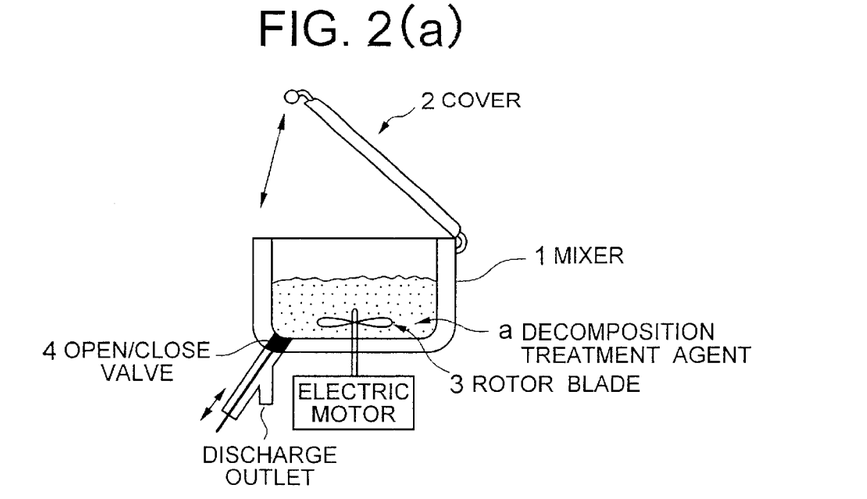
Figure 2B:
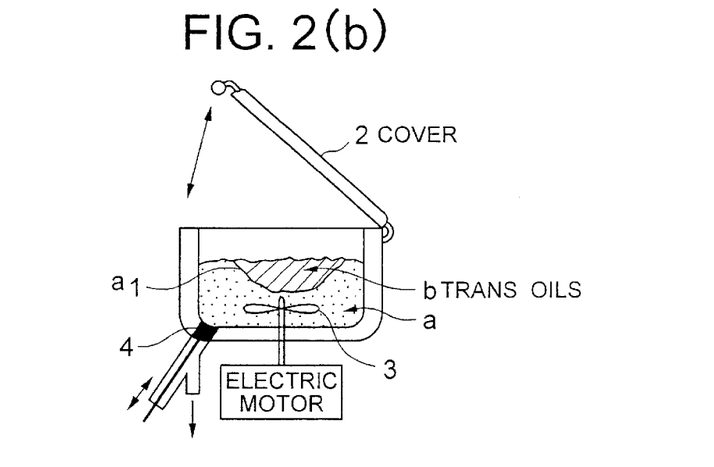

Examples of the invention will now be explained. In FIG. 2(a), 50 Kg of a decomposition agent (a) composed mainly of calcium oxide (CaO) powder, whose surface is coated with a vegetable oil, and quartz porphyry powder is loaded into a sealed mixer (for example, a Henschel mixer) 1, a depression a1 is created at the center of the layer of the decomposition agent (a), and 50 liters of trans oil (b) containing PCBs is loaded into the depression a1 (FIG. 2(b)).

Figure 2C:
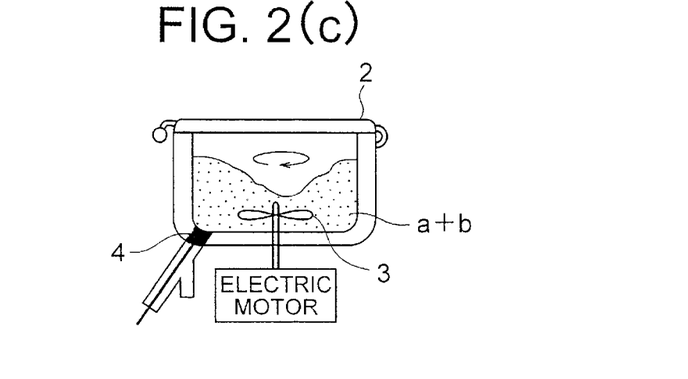
Figure 3D:
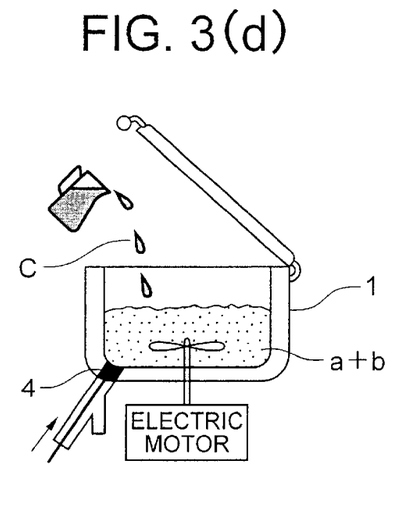

Next, the lid 2 of the mixer 1 is closed, and the stirrer blade 3 is rotated at high speed for uniform stirring/mixing of the decomposition agent (a) and trans oil (b) (FIG. 2 (c)). Rotation of the stirring blade 3 is then halted, the lid 2 is opened and 20 liters of water (c) containing a surfactant is poured into the mixer 1 (FIG. 3(d)).

Figure 3E:
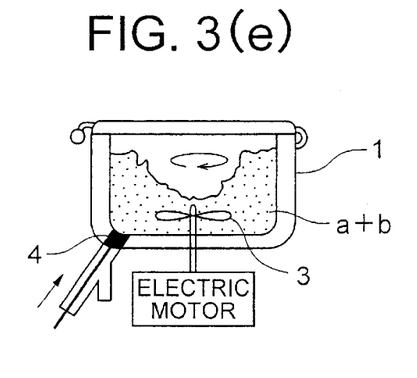
Figure 3F:
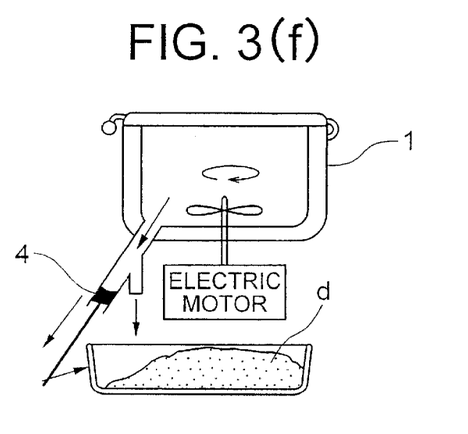

The lid 2 of the mixer 1 is then closed to seal the mixer 1, and the stirring blade 3 is again rotated at high speed for stirring/mixing of the decomposition agent (a) and trans oil (b) for one minute (FIG. 3(e)). Next, an open/close valve 4 provided at the bottom of the mixer 1 is opened while rotating the stirring blade 3, and the powder (d) which consists of a mixture of the decomposition agent and the trans oil is discharged into a stainless steel vat 5 (FIG. 3(f)).

Figure 4G:
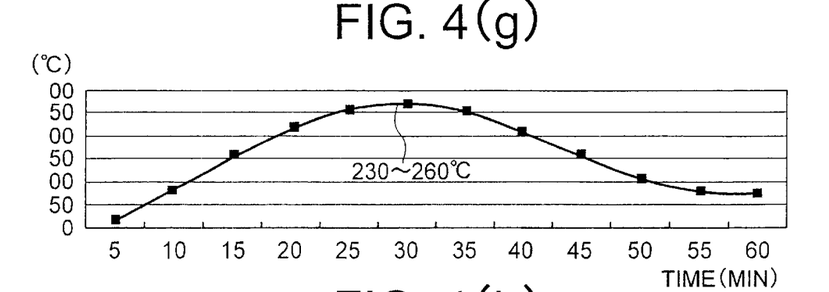

It was found that water vapor was released from the mixture powder (d) in the vat 5 as time passed, producing a hydration reaction in the mixture. Temperature change continued over a period of about 60 minutes, reaching a maximum temperature of about 250° C. (230° C. through 260° C.) after about 30 minutes had elapsed (FIG. 4(g)).

Analysis of the water vapor generated from the mixture showed that all of it was water vapor that had evaporated from the water, and absolutely no PCBs were detected.

Figure 4H:
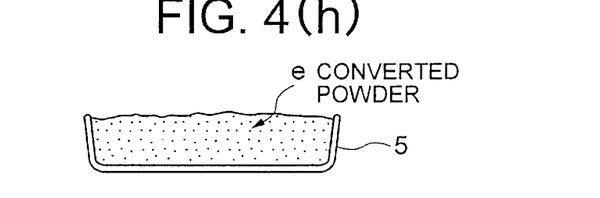

The reaction was then suspended, and the vat 5 contained powder (e) as the reaction product of the decomposition agent and trans oil (FIG. 4(h)).

Figure 7:
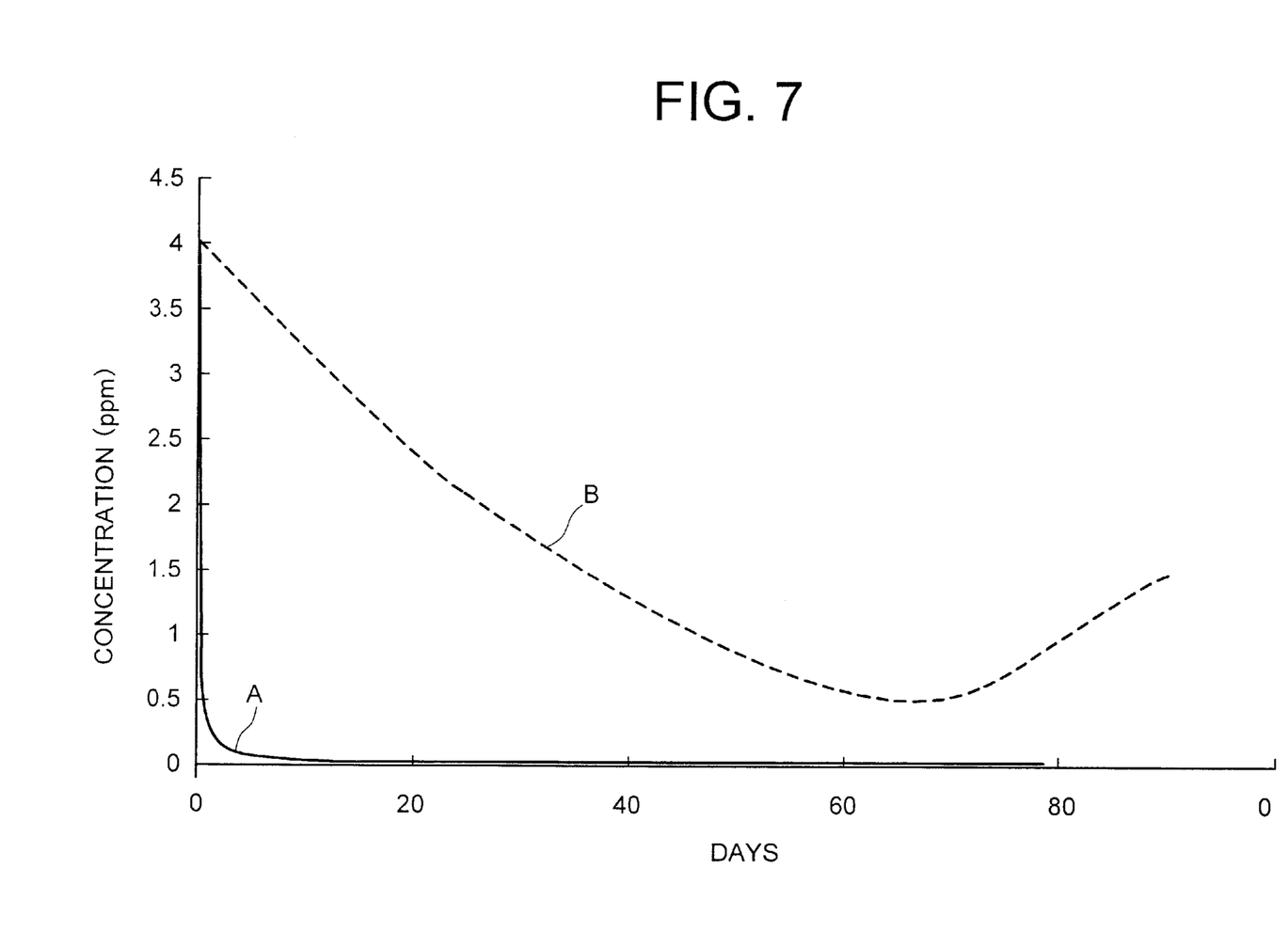
FIG. 7 is a view showing a change in the PCB concentration after chemical decomposition treatment.

FIG. 7 shows chronological changes in PCB concentration with respect to reacted powder (e) after the chemical decomposition treatment. A curve (A) shown with a solid line shows an example in which a decomposing agent mainly composed of calcium oxide (CaO) powder and quartz porphyry powder was used, and a curve (B) shown with a dashed line shows an example in which a decomposing agent mainly composed of calcium oxide (CaO) powder was used without adding any quartz porphyry. As has been made clear through comparison of both curved lines (A) and (B), when the decomposing agent not having any quartz porphyry added was used, as in the curved line (B), the PCB concentration decreased from 4 ppm in line with an elapse of days, but it did not decrease below 0.5 ppm. Further, contrarily, the PCB concentration increased again after approx. 70 days elapsed. However, according to the curve line (A) showing the case where quartz porphyry powder is included in the decomposing agent, the PCB concentration radically decreased after the chemical decomposition treatment and drew close to zero as much as possible, and in this case, there was no case where the PCB concentration increases again.

Figure 4I:
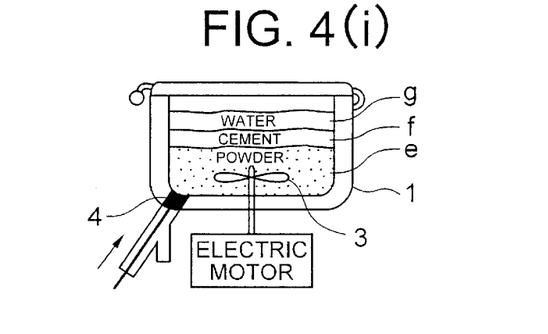
Figure 4J:
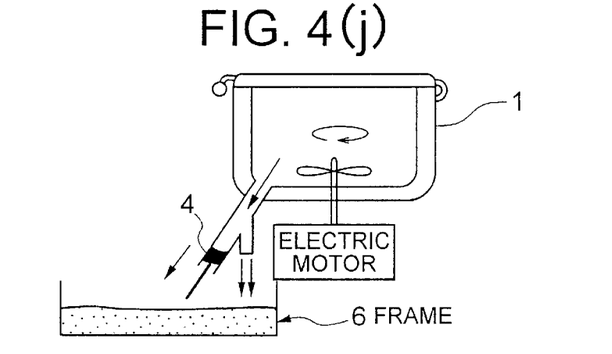
Figure 4K:
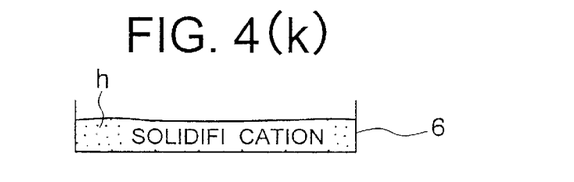

For subsequent pelletizing treatment, the obtained powder was placed in the mixer 1, water (g) and cement (f) were added, the mixture was stirred and kneaded (FIG. 4(i)), and the kneaded mixture obtained in the mixer 1 was cast into a frame 6 and the surface was flattened evenly (FIG. 4(j)). The kneaded mixture cast into the frame 6 was cured for a prescribed period and allowed to solidify (FIG. 4(k)).

Figure 5L:
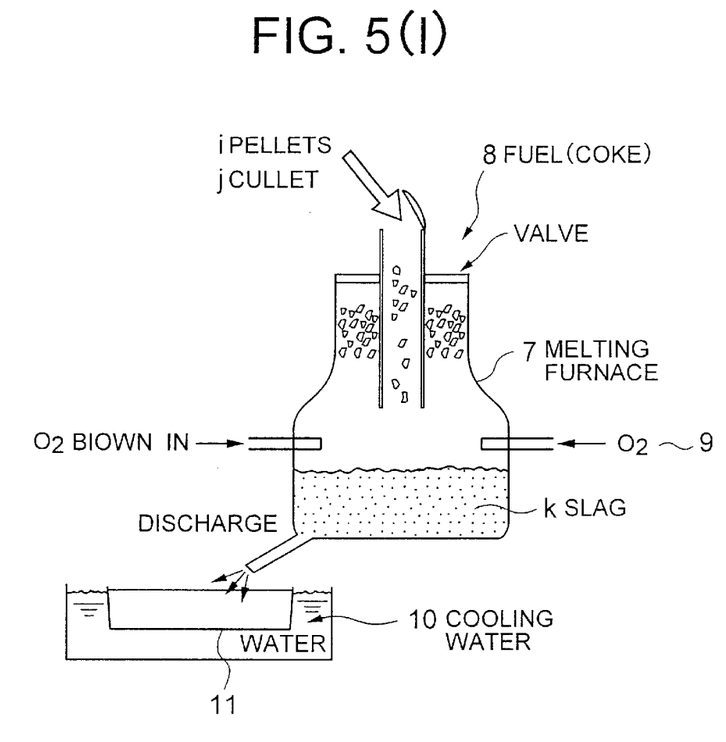

The obtained solid (h) was removed from the frame 6 and crushed into pellet (i) of size 1–3 cm using a crusher. The obtained pellets (i) were loaded into a melting furnace 7 together with glass cullet (colored glass or other glass scrap) (j), and using coke 8 as fuel with oxygen-enriched air 9 fed into the furnace, the mixture of pellets and glass cullet was exposed to a high temperature of 1700–1800° C. for melting, and the slag (k) therefrom was discharged through a pouring gate into a pallet 11 cooled with cooling water 10 (FIG. 5(l)).

Figure 5M:
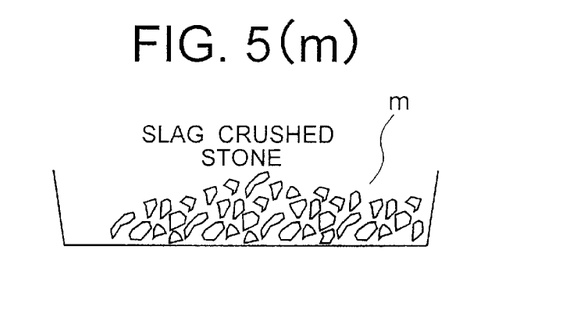
Figure 5N:
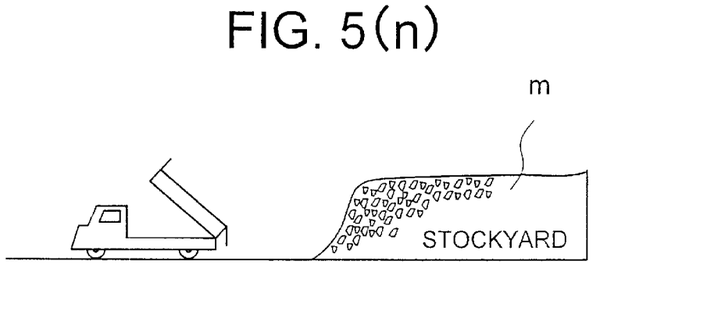

The slag was cooled and solidified in the pallet 11. Next, the obtained solid (1) was crushed into a crushed stone condition using a crusher (FIG. 5(m)), and the slag crushed stone (m) obtained by the crushing was finally passed through a sieve for adjustment of the particle size, and stored at a stockyard (FIG. 5(n)). With regard to the standards for effective use of slag crushed stone, the slag-crushed stones were intensive far-infrared ray radiators. The dioxins were below detectable limits. The heavy metals were, of course, within soil environmental standards, wherein it has been proven that the slag-crushed stones can be utilized as civil engineering materials, building materials, decorative materials or the like.

As explained above, the present invention basically provides a two-stage process for pre-treatment of chemical treatment and post-treatment of thermal treatment to allow treatment of large volumes. In the chemical decomposition treatment, the PCB contained in transformer oil and the like is effectively decomposed and made harmless by a decomposing effect and exothermic reaction of CaO and far-infrared rays emitted by quartz porphyry, and simultaneously, the solid by-product can be effectively utilized as raw materials for construction. In particular, since the by-products obtained by the treatment according to the invention are radiators of intensive far-infrared rays, they can be widely utilized as various types of construction materials, and agricultural materials, etc., In particular, according to the invention, powder that is generated by the chemical decomposing treatment is solidified into pellets by the pelletizing treatment, wherein no dust and dirt are generated in a treatment facility, and not only is no secondary treatment required with respect to the by-products but also the by-products can be effectively used as materials. Still further, the invention also accomplishes a pelletizing treatment of the powder produced by the chemical decomposition treatment, whereby solidified pellets are made to prevent the PCB possibly remaining in the powder from blowing away during the thermal decomposition treatment, so that the working environment for the thermal decomposition of the post-treatment is not contaminated, and handling may be facilitated.

What is claimed is:

1. A method for converting polychlorinated biphenyl oil into a resource by a chemical decomposition treatment, a pelletizing treatment and a thermal decomposition treatment, wherein the chemical decomposition treatment decomposes the polychlorinated biphenyl oil to powder including a metal salt by applying a decomposition action of CaO to said polychlorinated biphenyl oil and acting far-infrared rays emitted by quartz porphyry;

the pelletizing treatment solidifies the powder, which is generated by said chemical decomposition treatment, into pellets;

said thermal decomposition treatment thermally melts said pellets, which are generated by said pelletizing treatment, and glass cullet at a temperature above a thermal decomposition temperature of said polychlorinated biphenyl, and integrates said pellets and glass cullet as slag, wherein the integrated slag is cooled to be made into a solid to be reused as resources.

2. The method for converting polychlorinated biphenyl oil into a resource as set forth in claim 1, wherein said chemical decomposition treatment includes a process of decomposing the polychlorinated biphenyl oil by causing heat due to an exothermic reaction of CaO to act onto the quartz porphyry and causing far-infrared rays to be irradiated from the quartz porphyry under a condition that it is heated above 200° C.

3. The method for converting polychlorinated biphenyl oil into a resource as set forth in claim 1, wherein in said chemical decomposition treatment, minus ions irradiated from the quartz porphyry are acted onto the polychlorinated biphenyl oil, and said polychlorinated biphenyl oil is further decomposed by its reduction actions.

4. The method for converting polychlorinated biphenyl oil into a resource as set forth in claim 1, wherein said thermal decomposition treatment thermally decomposes polychlorinated biphenyl oil constituents possibly remaining in the powder that is generated by said chemical decomposition treatment.

5. The method for converting polychlorinated biphenyl oil into a resource as set forth in claim 1, wherein said thermal decomposition treatment is carried out in a melting furnace with coke as a fuel, and the pellets that are produced by the pelletizing treatment also serve to adjust a degree of basicity for loading into said melting furnace.

6. A decomposing agent for polychlorinated biphenyl oil, including calcium oxide whose surface is coated with a vegetable oil and quartz porphyry powder.

7. The method for converting polychlorinated biphenyl oil into a resource as set forth in claim 1, wherein said slag obtained by said thermal decomposition treatment is a radiator of the far-infrared rays.

* * * * *